(12) United States Patent
Koseoglu et al.

(10) Patent No.: US 9,889,430 B2
(45) Date of Patent: Feb. 13, 2018

(54) SOLID BASE CATALYST COMPOSITIONS USEFUL IN REMOVAL OF OXIDIZED SULFUR COMPOUNDS AND METHOD FOR MAKING SOLID BASE CATALYST COMPOSITIONS

(71) Applicant: Saudi Arabian Oil Company, Dhahran (SA)

(72) Inventors: Omer Refa Koseoglu, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 17 days.

(21) Appl. No.: 14/984,391

(22) Filed: Dec. 30, 2015

(65) Prior Publication Data

US 2016/0107142 A1    Apr. 21, 2016

Related U.S. Application Data

(62) Division of application No. 13/558,081, filed on Jul. 25, 2012, now Pat. No. 9,555,396.

(60) Provisional application No. 61/513,620, filed on Jul. 31, 2011.

(51) Int. Cl.
| | |
|---|---|
| *B01J 23/06* | (2006.01) |
| *C10G 29/04* | (2006.01) |
| *C10G 29/16* | (2006.01) |
| *B01J 37/06* | (2006.01) |
| *B01J 23/00* | (2006.01) |

(Continued)

(52) U.S. Cl.
CPC .............. *B01J 23/06* (2013.01); *B01J 21/04* (2013.01); *B01J 23/007* (2013.01); *B01J 37/06* (2013.01); *B01J 37/08* (2013.01); *C10G 29/04* (2013.01); *C10G 29/16* (2013.01)

(58) Field of Classification Search
CPC ........ B01J 23/005; B01J 23/007; B01J 23/06; B01J 37/06; B01J 37/08
USPC .................................................. 502/342, 524
See application file for complete search history.

(56) References Cited

U.S. PATENT DOCUMENTS

| | | |
|---|---|---|
| 2,744,054 A | 5/1956 | Johan |
| 3,413,307 A | 11/1968 | Heimlich et al. |
| 3,565,793 A | 2/1971 | Herbstman et al. |

(Continued)

FOREIGN PATENT DOCUMENTS

| | | |
|---|---|---|
| CN | 1517430 A | 8/2004 |
| CN | 1718681 A | 1/2006 |

(Continued)

OTHER PUBLICATIONS

"Zn,Al hydrotalcites calcined at different temperatures: Preparation, characterization and photocatalytic activity in gas-solid regime," D. Carriazo et al. Journal of Molecular Catalysis A: Chemical 342-343 (2011), pp. 83-90.*

(Continued)

*Primary Examiner* — Patricia L. Hailey
(74) *Attorney, Agent, or Firm* — Abelman, Frayne & Schwab

(57) ABSTRACT

The process provided herein is concerned with disposal of oxidized sulfur compounds formed by oxidative desulfurization. The process uses solid base catalyst in the presence of a caustic solution or solid base catalyst pretreated with a base and eliminates the need to separate the sulfones from the hydrocarbon streams and recover the hydrocarbons.

6 Claims, 2 Drawing Sheets

(51) Int. Cl.
*B01J 21/04* (2006.01)
*B01J 37/08* (2006.01)

(56) References Cited

U.S. PATENT DOCUMENTS

| | | | |
|---|---|---|---|
| 4,333,846 A | * | 6/1982 | Lee .................... B01J 41/10 |
| | | | 252/184 |
| 4,835,338 A | | 5/1989 | Liu |
| 5,169,516 A | | 12/1992 | Carr |
| 5,286,372 A | | 2/1994 | Arena et al. |
| 5,318,936 A | | 6/1994 | Ferm et al. |
| 5,360,536 A | | 11/1994 | Nemeth et al. |
| 5,389,240 A | | 2/1995 | Gillespie et al. |
| 5,858,212 A | | 1/1999 | Darcy |
| 5,961,819 A | | 10/1999 | Lee et al. |
| 6,087,544 A | | 7/2000 | Wittenbrink et al. |
| 6,174,178 B1 | | 1/2001 | Reinhold |
| 6,277,271 B1 | | 8/2001 | Kocal |
| 6,368,495 B1 | | 4/2002 | Kocal et al. |
| 6,402,940 B1 | | 6/2002 | Rappas |
| 6,673,230 B2 | | 1/2004 | Hagen et al. |
| 7,144,499 B2 | | 12/2006 | Han et al. |
| 7,300,476 B1 | | 11/2007 | Huff, Jr. et al. |
| 7,314,545 B2 | | 1/2008 | Karas et al. |
| 7,374,666 B2 | | 5/2008 | Wachs |
| 7,591,943 B2 | | 9/2009 | Yoo et al. |
| 7,615,145 B2 | | 11/2009 | Yoo et al. |
| 7,790,021 B2 | | 9/2010 | Kocal et al. |
| 2004/0026299 A1 | * | 2/2004 | Chamberlain |
| | | | Pravia ............... C10G 25/00 |
| | | | 208/263 |
| 2005/0150819 A1 | | 7/2005 | Wachs |
| 2007/0151901 A1 | | 7/2007 | Sain et al. |
| 2007/0227951 A1 | | 10/2007 | Thirugnanasampanthar et al. |
| 2008/0091043 A1 | | 4/2008 | Yoo et al. |
| 2008/0121565 A1 | | 5/2008 | Yoo et al. |
| 2008/0149533 A1 | | 6/2008 | Yoo et al. |
| 2008/0308463 A1 | | 12/2008 | Keckler et al. |
| 2009/0065399 A1 | | 3/2009 | Kocal et al. |
| 2011/0031164 A1 | | 2/2011 | Litz et al. |
| 2013/0037448 A1 | * | 2/2013 | Al-Hajji ............... B01J 37/06 |
| | | | 208/263 |
| 2015/0238927 A1 | * | 8/2015 | O'Hare ................ C01F 7/005 |
| | | | 502/406 |

FOREIGN PATENT DOCUMENTS

| | | | | |
|---|---|---|---|---|
| CN | 10 5801748 | * | 7/2016 | ............ C08F 220/14 |
| JP | 2004168663 A | | 6/2004 | |
| WO | 0218518 A1 | | 3/2002 | |
| WO | 03014266 A1 | | 2/2003 | |
| WO | 03074633 A1 | | 9/2003 | |
| WO | 2006071793 A1 | | 7/2006 | |
| WO | 2008083563 A1 | | 7/2008 | |

OTHER PUBLICATIONS

"Zinc-aluminum hydrotalcites as precursors of basic catalysts: Preparation, characterization and study of the activation of methanol," Tania Montanari et al. Catalysis Today 152 (2010), pp. 104-109.*

Al-Shahrani, Farhan, "Desulfurization of diesel via the $H_2O_2$ oxidation of aromatic sulfides to sulfones using a tungstate catalyst," Applied Catalysts B: Enviromental, vol. 73, 311-316 (2007).

Costantino, Umberto, "New Polymeric Composites Based on Poly(#-caprolactone) and Layered Double Hydroxides Containing Antimicrobial Species," ACS Applied Materials and Interfaces, vol. 1, No. 3, Feb. 16, 2009.

Kwon Park, Young, "Removal of sulfur dioxide from dibenzothiophene sulfone over Mg-based oxide catalysts prepared by spray pyrolysis," Korean J. Chem. Eng., vol. 27, No. 2, Mar. 2010.

Ma, Xiaoliang, "Hydrodesulfurization Reactivities of Various Sulfur Compounds in Diesel Fuels," Ind. Eng. Chem. Res., vol. 33, 218-222, (1994).

Ma, Xiaoliang, "Hydrodesulfurization Reactivities of Various Sulfur Compounds in Vacuum Gas Oils," Ind. Eng. Chem. Res., vol. 35, 2487-2494, (1996).

Manzi-Nshuti, Charles, "Aluminum-containing Layered Double Hydroxides: the Thermal, Mechanical, and Fire Properties of (Nano)composites of Poly(methyl Methacrylate)," Journal of Materials Chemistry, vol. 18, (2008).

PCT/US2012/048167, International Search Report and Written Opinion dated Nov. 20 2012, 14 pages.

Ertl, G., et al., Handbook of Heterogeneous Catalysis, vol. 3, First Edition, Mar. 15, 1997, Published by Wiley VCH, pp. 64-72.

Lacount, Robert B., et al., "Oxidation of Dibenzothiophene and Reaction of Dibenzothiophene 5,5-Dioxide with Aqueous Alkali", J. Org. Chem., vol. 42, No. 16, pp. 2751-2754 (1977).

* cited by examiner

SOLID BASE CATALYST COMPOSITIONS USEFUL IN REMOVAL OF OXIDIZED SULFUR COMPOUNDS AND METHOD FOR MAKING SOLID BASE CATALYST COMPOSITIONS

RELATED APPLICATIONS

The present application is a divisional application under 35 USC § 120 of U.S. application Ser. No. 13/558,081 filed on Jul. 25, 2012, which claims the benefit of U.S. Provisional Patent Application No. 61/513,620 filed Jul. 31, 2011, the disclosures of which are hereby incorporated by reference in their entireties.

BACKGROUND OF THE INVENTION

Field of the Invention

The present invention relates to reducing the sulfur content from a mixture of hydrocarbons and oxidized sulfur compounds formed by oxidative desulfurization.

Description of Related Art

The discharge into the atmosphere of sulfur compounds during processing and end-use of the petroleum products derived from sulfur-containing sour crude oil poses health and environmental problems. Stringent reduced-sulfur specifications applicable to transportation and other fuel products have impacted the refining industry, and it is necessary for refiners to make capital investments to greatly reduce the sulfur content in gas oils to 10 parts per million by weight (ppmw) or less. In the industrialized nations such as the United States, Japan and the countries of the European Union, refineries have already been required to produce environmentally clean transportation fuels. For instance, in 2007 the United States Environmental Protection Agency required the sulfur content of highway diesel fuel to be reduced by 97%, from 500 ppmw (low sulfur diesel) to 15 ppmw (ultra-low sulfur diesel). The European Union has enacted even more stringent standards, requiring diesel and gasoline fuels sold in 2009 to contain less than 10 ppmw of sulfur. Other countries are following in the footsteps of the United States and the European Union and are moving forward with regulations that will require refineries to produce transportation fuels with ultra-low sulfur levels.

To keep pace with recent trends toward production of ultra-low sulfur fuels, refiners must choose among the processes or crude oils that provide flexibility that ensures future specifications are met with minimum additional capital investment, in many instances by utilizing existing equipment. Conventional technologies such as hydrocracking and two-stage hydrotreating offer solutions to refiners for the production of clean transportation fuels. These technologies are available and can be applied as new grassroots production facilities are constructed. However, many existing hydroprocessing facilities, such as those using relatively low pressure hydrotreaters, represent a substantial prior investment and were constructed before these more stringent sulfur reduction requirements were enacted. It is very difficult to upgrade existing hydrotreating reactors in these facilities because of the comparatively more severe operational requirements (i.e., higher temperature and pressure) to obtain clean fuel production. Available retrofitting options for refiners include elevation of the hydrogen partial pressure by increasing the recycle gas quality, utilization of more active catalyst compositions, installation of improved reactor components to enhance liquid-solid contact, the increase of reactor volume, and the increase of the feedstock quality.

There are many hydrotreating units installed worldwide producing transportation fuels containing 500-3000 ppmw sulfur. These units were designed for, and are being operated at, relatively mild conditions (i.e., low hydrogen partial pressures of 30 kilograms per square centimeter for straight run gas oils boiling in the range of 180° C. to 370° C.).

With the increasing prevalence of more stringent environmental sulfur specifications in transportation fuels mentioned above, the maximum allowable sulfur levels are being reduced to no greater than 15 ppmw, and in some cases no greater than 10 ppmw. This ultra-low level of sulfur in the end product typically requires either construction of new high pressure hydrotreating units, or a substantial retrofitting of existing facilities, e.g., by incorporating gas purification systems, reengineering the internal configuration and components of reactors, and/or deployment of more active catalyst compositions.

Sulfur compounds can be classified into four groups according to their hydrodesulfurization reactivity described by the pseudo-first-order rate constants. See, e.g., X. Ma et al., *Ind. Eng. Chem.*, 1994, 33, 218; X. Ma et al., *Ind. Eng. Chem. Res.*, 1995, 34, 748. These groups are:

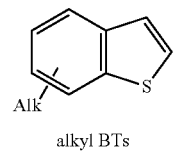

alkyl BTs

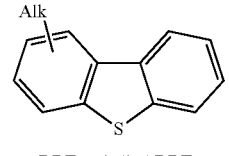

DBT and alkyl DBTs

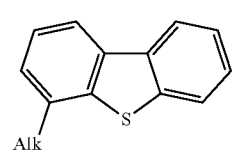

4- or 6- alkyl DBTs

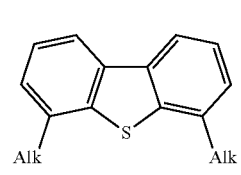

4- and 6- alkyl DBTs

The first group is predominantly alkyl benzothiophenes (BTs); the second, dibenzothiophenes (DBTs) and alkyl DBTs without alkyl substituents at the 4- and 6-positions; the third group, alkyl DBTs with only one alkyl substituent at either the 4- or 6-position; the fourth group, alkyl DBTs with alkyl substituents at the 4- and 6-positions. The sulfur content in the four groups is 39, 20, 26 and 15 wt. %, respectively. The relative hydrodesulfurization rate constant for each of the four groups is 36, 8, 3, and 1, respectively.

When the total sulfur content is reduced to 500 ppmw, the main sulfur compounds remaining in the hydrotreated effluent are the third and fourth groups. When the total sulfur content is reduced to 30 ppmw, the sulfur compounds remaining are only the fourth group sulfur compounds, indicating that the lower sulfur content organosulfur compounds have lower hydrodesulfurization reactivity. See D. D. Whitehurst et al., *Catalysis Today*, 1998, 45, 299.

Consequently, these species from the third and fourth groups are referred to as refractory sulfur compounds. Both steric hindrance and electronic density factors contribute to the low reactivity levels of 4- and 6-substituted DBTs in hydrodesulfurization process. See X. Ma et al. (1995); M. Daage et al., *J. Catal.*, 1994, 194, 414.

The economical removal of refractory sulfur-containing compounds is therefore exceedingly difficult to achieve, and accordingly removal of sulfur-containing compounds in hydrocarbon fuels to an ultra-low sulfur level is very costly by current techniques. When previous regulations permitted sulfur levels up to 500 ppmw, there was little need or incentive to desulfurize beyond the capabilities of conventional hydrodesulfurization, and hence the refractory sulfur-containing compounds were not targeted. However, in order to meet the more stringent sulfur specifications, these refractory sulfur-containing compounds must be substantially removed from hydrocarbon fuels streams.

Compared with conventional catalytic hydrodesulfurization, oxidative desulfurization (ODS) can be performed under mild conditions, i.e., relatively low temperature and under atmospheric pressure conditions. ODS typically uses an oxidizing agent, such as hydrogen peroxide, organic peroxide, peracid and ozone, in addition to an oxidation catalyst. In the oxidation process, the divalent sulfur atom of refractory sulfur compounds (condensed thiophene) is oxidized by the electrophilic addition reaction of oxygen atoms to form the hexavalent sulfur of sulfones. The chemical and physical properties of sulfones are significantly different from those of the hydrocarbons in fuel oil. Therefore, sulfones can be removed by conventional separation methods such as filtration, solvent extraction and adsorption. An effective ODS process which has been shown to decrease sulfur in transportation fuel from 1100 ppm to 40 ppmw, is described in Al-Shahrani et al. WO/2007/103440 and in Al-Shahrani et al. *Applied Catalysis B*, V. 73, No. 3-4, p. 311 (2007). ODS is considered a promising substitute or supplement to hydrodesulfurization for deep desulfurization of transportation fuels.

The compositions of common sulfides in fuel oil and their respective sulfones are tabulated in Table 1:

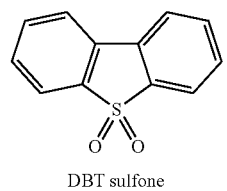
DBT sulfone

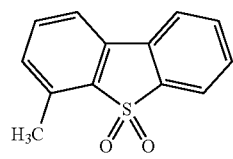
4-MDBT sulfone

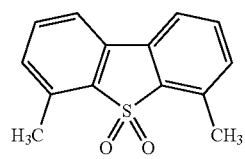
4,6-DMDBT sulfone

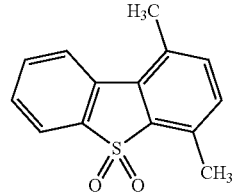
1,4-DMDBT sulfone

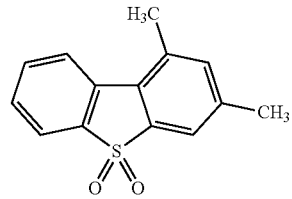
1,3-DMDBT sulfone

TABLE 1

|  | DBT | DBT Sulfone (DBTO$_2$) | 4-Methyl DBT (4-MDBT) | 4-Methyl DBT Sulfone (4-MDBTO$_2$) | 4,6-Dimethyl DBT (4,6-DMDBT) | 4,6-Dimethyl DBT Sulfone (4,6-DMDBTO$_2$) |
|---|---|---|---|---|---|---|
| C H % | 82.58 | 70.36 | 83.81 | 72.16 | 84.88 | 73.76 |
| S % | 17.42 | 14.84 | 16.19 | 13.94 | 15.12 | 13.14 |
| O % | 0 | 14.80 | 0 | 13.90 | 0 | 13.10 |

Sulfones formed by ODS of diesel fuels are complex mixtures that vary based on the crude source and other factors, including DBT sulfone along with several alkyl substituted DBT sulfones, such as 4-MDBT sulfone, 4,6-DMDBT sulfone, 1,4-DMDBT sulfone, 1,3-DMDBT sulfone, TriMDBT sulfone, TriEDBT sulfone, and C3DBT sulfone. The structures of certain sulfones found in ODS treated sulfones are given below.

-continued

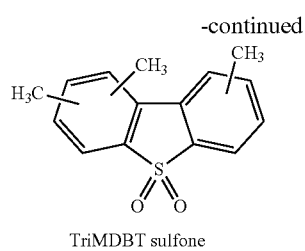
TriMDBT sulfone

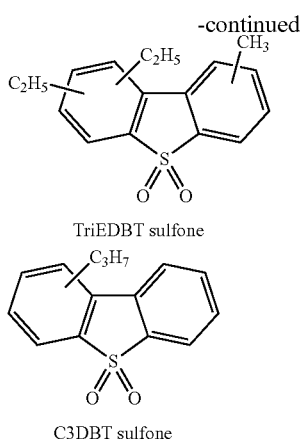

TriEDBT sulfone

C3DBT sulfone

Unlike hydrodesulfurization, in which desulfurized products remain with fuel oil and organic sulfur is converted into gaseous H₂S that leave the product, i.e., fuel oil mixture, sulfones formed by ODS must be separated from the product. Various attempts have been made to dispose oxidized sulfur compounds formed by oxidative desulfurization. These techniques include conventional extraction, distillation and adsorption.

Kocal et al U.S. Patent Publication 2009/0065399 discloses an oxidative desulfurization process in which a thiophene-rich diesel stream is combined with an oxidant to oxidize the thiophenes to sulfones. The resulting stream is separated into sulfone oil and first low-sulfur diesel stream. The sulfone oil is then combined with a caustic stream (e.g., sodium hydroxide, potassium hydroxide, etc.) to produce a second low-sulfur diesel stream and sodium sulfide organic compounds. However, sulfone oil must be extracted first to reduce the volume that needs to be treated with caustic stream. The solvent extraction processes can result in an undesirable loss of hydrocarbon product yield. The mixing of sulfone oil with caustic stream generates a liquid-liquid multiphase system from which the aqueous sulfite solution settles.

With the steady increase in demand for hydrocarbon fuels having an ultra-low sulfur level, a need exists for an efficient and effective process and apparatus for desulfurization while maximizing product yield.

Accordingly, it is an object of the present invention to effectively reducing the concentration of oxidized sulfur compounds from a mixture of liquid hydrocarbons and the oxidized sulfur compounds.

SUMMARY OF THE INVENTION

In accordance with one or more embodiments, the invention relates to a system and method for reducing the sulfur content from a mixture of hydrocarbons and oxidized sulfur compounds formed by oxidative desulfurization.

In accordance with one embodiment, a process for reducing the sulfur content from a mixture of hydrocarbons and oxidized sulfur compounds is provided by contacting the mixture with an effective amount of solid base catalyst composition in the presence of a caustic solution. The solid base catalyst composition includes separate components or a mixture of zinc oxide, aluminum oxide, zinc aluminates, layered double hydroxides, and magnesium/aluminum layered double hydroxide. The contacting occurs under conditions effective to promote catalytic decomposition of a portion of the oxidized sulfur compounds into $SO_x$, which is removed from the hydrocarbon mixture. A hydrocarbon product having a reduced concentration of oxidized sulfur compounds is recovered.

In accordance with another embodiment, a process for reducing the concentration of oxidized sulfur compounds from a mixture of liquid hydrocarbons and the oxidized sulfur compounds is provided by contacting the mixture with an effective amount of solid catalyst composition pretreated with a base. The solid catalyst composition includes separate components or a mixture of zinc oxide, aluminum oxide, zinc aluminates, layered double hydroxides, and magnesium/aluminum layered double hydroxide. The contacting occurs under conditions effective to promote catalytic decomposition of a portion of the oxidized sulfur compounds into $SO_x$, which is removed from the hydrocarbon mixture. A hydrocarbon product having a reduced concentration of oxidized sulfur compounds is recovered.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The foregoing summary as well as the following detailed description of preferred embodiments of the invention will be best understood when read in conjunction with the attached drawings. For the purpose of illustrating the invention, there are shown in the embodiments which are presently preferred. It should be understood, however, that the invention is not limited to the precise arrangements and apparatus shown. In the drawings the same numeral is used to refer to the same or similar elements, in which.

DETAILED DESCRIPTION OF THE INVENTION

A process is provided for reducing the concentration of oxidized sulfur compounds from a mixture of liquid hydrocarbons and oxidized sulfur compounds. For instance, such a mixture is commonly produced by oxidative desulfurization of liquid hydrocarbons.

In one embodiment, the mixture of hydrocarbons and oxidized sulfur compounds are contacted with an effective amount of layered double hydroxide solid catalyst in the presence of a caustic solution.

In another embodiment, the mixture of hydrocarbons and oxidized sulfur compounds is contacted with an effective amount of layered double hydroxide solid catalyst pretreated with a caustic solution.

In both embodiments, the contacting of the mixture of hydrocarbons and oxidized sulfur compounds with the solid catalyst occurs under conditions effective to promote catalytic decomposition of a portion of the oxidized sulfur compounds into $SO_x$ which is subsequently removed. The resulting hydrocarbon product stream has a reduced concentration of oxidized sulfur compounds, and advantageously, the yield of the total liquid hydrocarbon stream is maximized by not removing the entire oxidized sulfur compounds.

While not wishing to be bound by theory, the reaction mechanism at the catalyst for pretreatment or co-treatment shown in Equation [1] is expected:

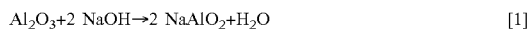

$$Al_2O_3 + 2\ NaOH \rightarrow 2\ NaAlO_2 + H_2O \qquad [1]$$

The caustic changes the alumina into sodium aluminate, which is the basic material as shown below. Sodium aluminate is the active species. The concentration is stoicmetric. Sufficient quantities are added to the solid catalyst for conversion.

Figure 1:
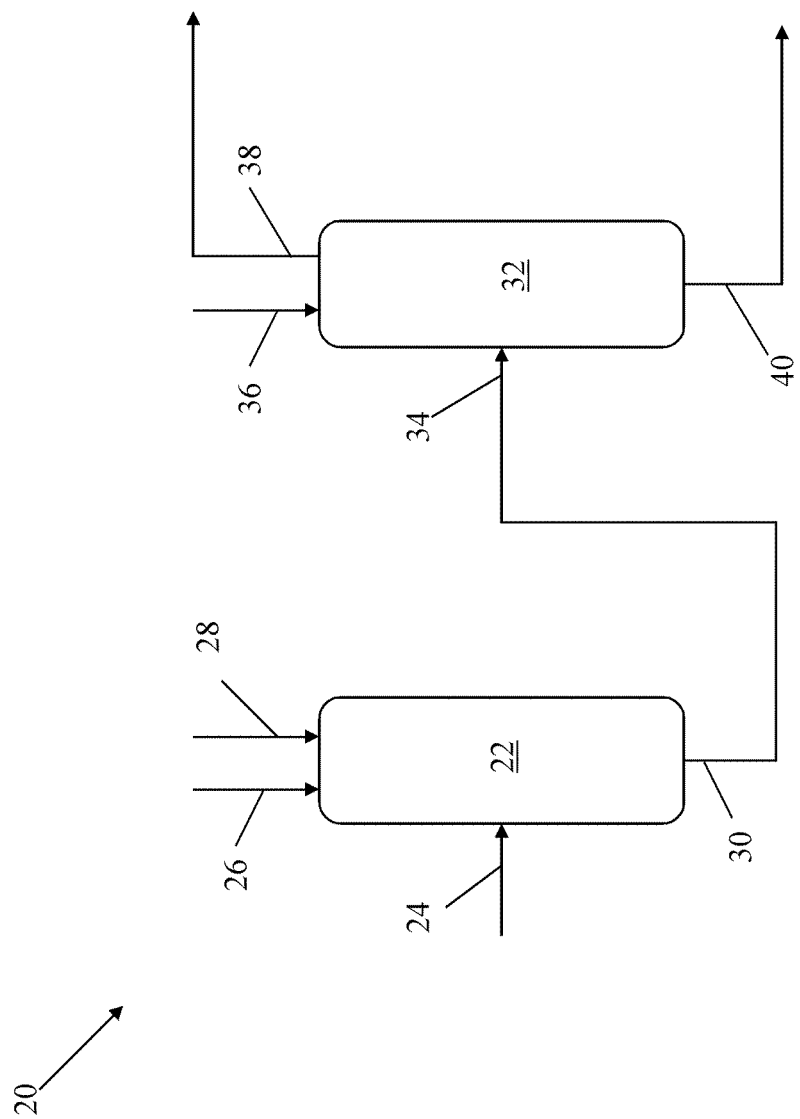
FIG. 1 is a schematic diagram of an integrated desulfurization system and process of disposal of oxidized sulfur compounds formed by oxidative desulfurization.

FIG. 1 shows an apparatus 20 for carrying out oxidative desulfurization and sulfone decomposition. Apparatus 20 includes an oxidative desulfurization zone 22 and a sulfone decomposition zone 32. Oxidative desulfurization zone 22 includes a feed inlet 24, an oxidizing agent inlet 26, an oxidizing catalyst inlet 28 and an oxidized effluent outlet 30. Sulfone decomposition zone 32 includes an inlet 34 in fluid communication with oxidized effluent outlet 30, a liquid caustic stream inlet 36, a gas outlet 38 and a desulfurized oil outlet 40.

A hydrocarbon stream is introduced via inlet 24 of the oxidative desulfurization zone 22 and into contact with an oxidizing agent via inlet 26 and an oxidizing catalyst via inlet 28 to oxidize sulfur compounds contained in the hydrocarbon feedstock. The oxidized effluent of oxidative desulfurization zone 22 containing oxidized sulfur compounds and hydrocarbons is discharged via outlet 30 and conveyed to inlet 34 of the sulfone decomposition zone 32 and into contact with an effective amount of solid catalyst and a liquid caustic solution that is introduced to the sulfone decomposition zone 32 via inlet 36. The contacting of the oxidized effluent with solid catalyst and liquid caustic solution occurs under conditions effective to promote catalytic decomposition of a portion of the oxidized sulfur compounds into $SO_x$ which is subsequently removed via outlet 38. The hydrocarbon product stream discharged via outlet 40 has a reduced concentration of oxidized sulfur compounds. The sulfur concentration may be as low as 10 ppmw for distillate fuels, in certain embodiments less than 1 percent by weight (W %) for fuels oil, and in further embodiments less than 0.1 W %.

Figure 2:
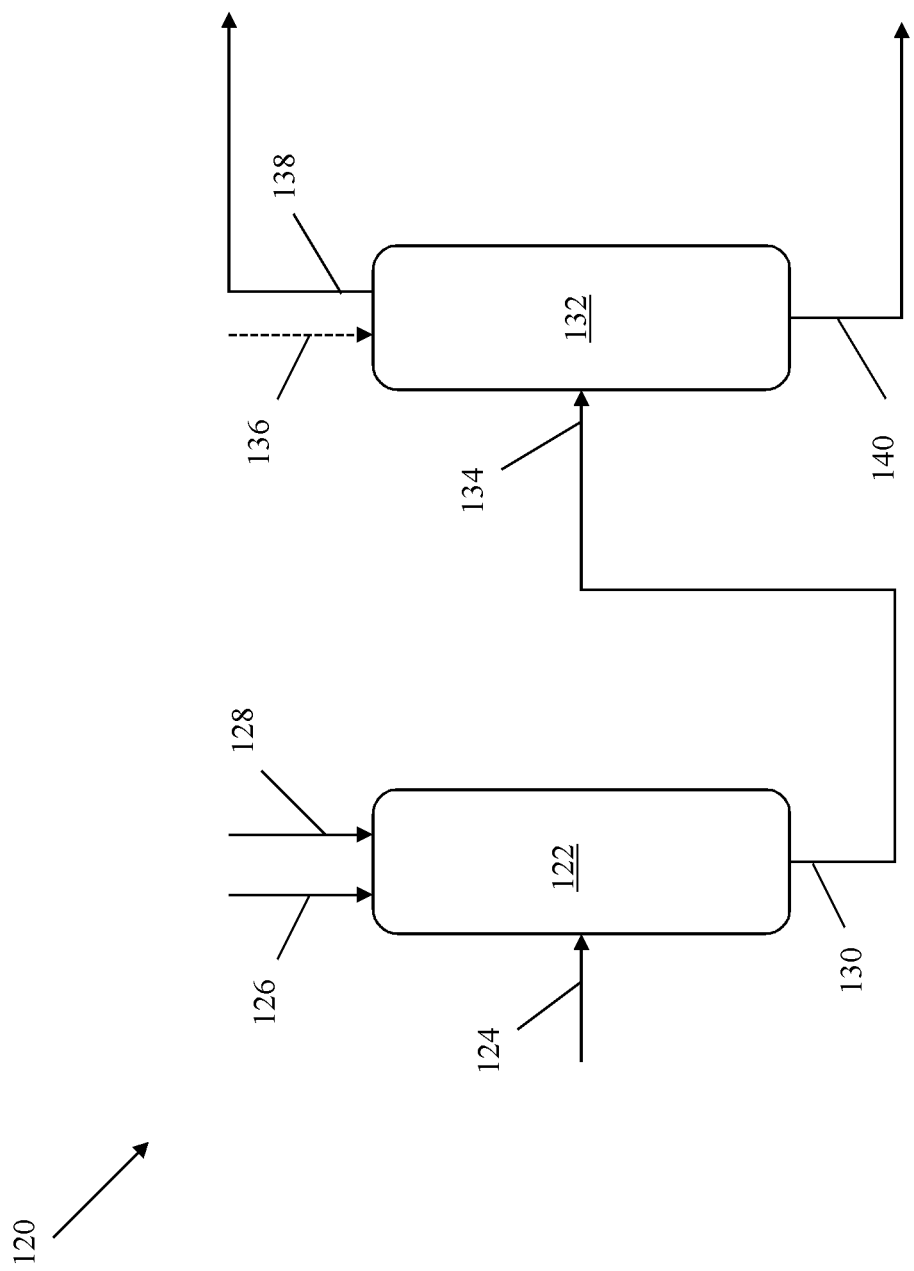
FIG. 2 is a schematic diagram of another integrated desulfurization system and process of disposal of oxidized sulfur compounds formed by oxidative desulfurization.

FIG. 2 shows another apparatus 120 for carrying out oxidative desulfurization and sulfone decomposition. Apparatus 120 includes an oxidative desulfurization zone 122 and a sulfone decomposition zone 132. Oxidative desulfurization zone 122 includes a feed inlet 124, an oxidizing agent inlet 126, an oxidizing catalyst inlet 128 and an oxidized effluent outlet 130. Sulfone decomposition zone 132 includes an inlet 134 in fluid communication with oxidized effluent outlet 130, an optional liquid caustic stream inlet 136, a gas outlet 138 and a desulfurized oil outlet 140.

A hydrocarbon stream is introduced via inlet 124 of the oxidative desulfurization zone 122 and into contact with an oxidizing agent via inlet 126 and an oxidizing catalyst via inlet 128 to oxidize sulfur compounds contained in the hydrocarbon feedstock. The oxidized effluent of oxidative desulfurization zone 122 containing oxidized sulfur compounds and hydrocarbons is discharged via outlet 130 and conveyed to inlet 134 of the sulfone decomposition zone 132 and into contact with an effective amount of pretreated solid catalyst. In certain embodiments, additional caustic solution can be introduced via optional inlet 136 (or mixed with feed via inlet 134) on a continuous or intermittent basis to maintain the caustic level of the pretreated solid catalyst composition. The contacting of the oxidized effluent with pretreated solid catalyst occurs under conditions effective to promote catalytic decomposition of a portion of the oxidized sulfur compounds into $SO_x$ which is subsequently removed via outlet 138. The hydrocarbon product stream discharged via outlet 140 has a reduced concentration of oxidized sulfur compounds. The sulfur concentration may be as low as 10 ppmw for distillate fuels, in certain embodiments less than 1 W % for fuels oil, and in further embodiments less than 0.1 W %.

While it is expected that a substantial portion of the $SO_x$ compounds produced by catalytic decomposition of the oxidized sulfur compounds will be $SO_2$, in certain reaction conditions, other $SO_x$ compounds will be produced.

The hydrocarbon stream that is subjected to oxidative desulfurization can be naturally occurring fossil fuels such as crude oil, shale oils, coal liquids, intermediate refinery products or their distillation fractions such as naphtha, gas oil, vacuum gas oil or vacuum residue or combination thereof. A suitable feedstock is characterized by a boiling point in the range of about 36° C. to about 1500° C., in certain embodiments in the range of about 80° C. to about 560° C., and in further embodiments in the range of about 180° C. to about 400° C., although one of ordinary skill in the art will appreciated that certain other hydrocarbon streams can benefit from the practice of the system and method of the present invention.

The hydrocarbon feedstream subjected to oxidation in oxidative desulfurization zone can also be an effluent from a hydrodesulfurization zone. In such case, the oxidized effluent from the oxidative desulfurization zone can be fractioned to remove the portion not containing oxidation products, e.g., a fraction boiling below about 320° C. to about 360° C., thereby reducing the requisite flow capacity of the sulfone decomposition zone.

In general, the operating conditions for the oxidative desulfurization zone include a reaction pressure in the range of from about 1 bar to about 30 bars, in certain embodiments about 1 bar to about 10 bars, in further embodiments about 1 bar to about 3 bars; a reaction temperature in the range of from about 20° C. to about 350° C., in certain embodiments about 20° C. to about 150° C., in further embodiments about 45° C. to about 80° C.; a liquid hourly space velocity in the range of from about 0.1 $h^{-1}$ to about 10 $h^{-1}$, in certain embodiments about 0.5 $h^{-1}$ to about 4 $h^{-1}$, in further embodiments about 1 $h^{-1}$ to about 2 $h^{-1}$; and a molar ratio of oxidizing agent-to-sulfur in the range of from about 1:1 to about 100:1, in certain embodiments about 1:1 to about 30:1, and in further embodiments about 1:1 to about 4:1.

In general, the operating conditions for the sulfone decomposition zone include a catalytic decomposition temperature in the range of from about 200° C. to about 600° C., in certain embodiments about 300° C. to about 400° C., in further embodiments about 300° C. to about 350° C.; a catalytic decomposition pressure in the range of from about 1 bar to about 30 bars, in certain embodiments about 1 bar to about 10 bars, in further embodiments about 1 bar to about 3 bars; and a liquid hourly space velocity in the range of from about 0.1 h$^{-1}$ to about 10 h$^{-1}$, in certain embodiments about 0.1 h$^{-1}$ to about 4 h$^{-1}$, in further embodiments about 0.5 h$^{-1}$ to about 2 h$^{-1}$.

In certain embodiments, the pressure in the sulfone decomposition zone is maintained by the hydrocarbon pressure alone, without additional overhead or blanketing gas. The sulfone decomposition zone can be in the form of a fixed, moving, fluidized, ebullated or swing bed system, with a fixed bed catalyst system being preferred in certain embodiments.

The oxidizing agent for use during oxidative desulfurization is selected from liquid hydrogen peroxide and organic peroxides selected from the group consisting of alkyl or aryl hydroperoxides and dialkyl and diaryl peroxides, wherein the alkyl and aryl groups of the respective dialkyl and diaryl peroxides are the same or different. An effective quantity of oxidizing agent is used, which varies with the selected compound(s). For instance, a molar ratio of hydrogen peroxide-to-sulfur is typically at least 4:1 to effectively oxidize organosulfur compounds into their respective oxidized sulfur compounds. In certain embodiment, the quantity of oxidizing agent is selected so that the respective oxidized sulfur compounds are primarily sulfones. Gaseous oxidants, such as air, oxygen, or nitrous oxide may be used. The oxidation catalysts may be homogeneous transition metal catalysts, active species of Mo(VI), W(VI), V(V), Ti(IV), or a combination thereof possessing high Lewis acidity with weak oxidation potential.

The solid catalyst for the sulfone decomposition zone may comprise separate components or a mixture of zinc oxide, aluminum oxide, zinc aluminates, layered double hydroxides such as hydrotalcite, and magnesium/aluminum layered double hydroxide. For example, such a catalyst may be a layered double hydroxide of the general formula $ZnAl_2O_4 \cdot x(ZnO) \cdot y(Al_2O_3)$, wherein x and y are independently between 0 and 2, and wherein the total proportion of $ZnAl_2O_4$ in the formula is at least 10 percent by weight. Suitable catalysts are porous material in the form of powder, extrudates or balls. The surface area of solid catalyst is in the range of from about 10 m$^2$/g to 600 m$^2$/g, in certain embodiments about 50 m$^2$/g to about 600 m$^2$/g. The pore volume of solid catalyst is in the range of from about 0.1 cm$^3$/g to about 0.5 cm$^3$/g, in certain embodiments about 0.3 cm$^3$/g to about 0.5 cm$^3$/g. The pore distribution of solid catalyst is between 0.001 microns and 0.1 microns.

The effective proportion of layered double hydroxide comprises at least 10 percent by weight of the total composition, in certain embodiments at least 50 percent by weight of the total composition, in further embodiments at least 100 percent by weight of the total composition.

In embodiments in which the solid catalyst is pretreated, suitable liquid caustic solutions include sodium hydroxide or potassium hydroxide. The catalyst can be prepared in-situ or ex-situ. In in-situ preparation, the γ-alumina solid catalyst is loaded to a reactor which is heated to 320° C. at 1 bar pressure. The liquid caustic solution is passed to the catalyst bed at liquid hourly space velocity in the range of from 0.5 h$^{-1}$ to 2 h$^{-1}$ for 3 hours. In ex-situ preparation, the γ-alumina solid catalyst is prepared in a batch vessel which is heated to 320° C. at 1 bar pressure. The liquid caustic solution is added to the batch vessel in the concentration range of from 0.05 W % to 30 W %. The mixture is stirred for 3 hours.

Accordingly, a system and process is described herein which is capable of efficiently and cost-effectively reducing the organosulfur content of hydrocarbon fuels. Deep desulfurization of hydrocarbon fuels according to the present invention effectively optimizes use of integrated apparatus and processes, combining oxidative desulfurization and sulfur decomposition using solid base catalyst. Using the apparatus and process of the present invention, refiners can adjust existing hydrodesulfurization equipment and run such equipment under mild operating conditions. The use of solid base catalyst eliminates the need to separate the sulfones from the hydrocarbon streams and recover the hydrocarbons. Accordingly hydrocarbon fuels can be economically desulfurized to an ultra-low level.

The present process offers distinct advantages when compared to conventional processes for disposal of oxidized sulfur compounds. For example, in certain conventional approaches, the oxidized sulfur compounds were treated with caustic solution, requiring separation of the sulfones from hydrocarbon streams by extraction and/or adsorption and recover the hydrocarbons. Furthermore, the high operating costs that can negatively impact certain desired fuel characteristics are avoided using the process and apparatus of the present invention.

The method and system of the present invention have been described above and in the attached drawings; however, modifications will be apparent to those of ordinary skill in the art and the scope of protection for the invention is to be defined by the claims that follow.

The invention claimed is:

1. A process for manufacturing a solid base catalyst comprising providing solid base catalyst composition including
   a layered double hydroxide of the general formula (I)

$$ZnAl_2O_4 \cdot x(ZnO) \cdot y(Al_2O_3) \qquad (I)$$

wherein x and y are independently between 0 and 2, and wherein the total proportion of $ZnAl_2O_4$ in the formula (I) is at least 10 percent by weight;
   loading the solid base catalyst composition in a reactor;
   heating the reactor to an effective temperature; and
   passing a liquid caustic solution over the solid base catalyst in the reactor for a period of time sufficient to impart alkaline quality to the solid base catalyst.

2. The process as in claim 1, wherein the effective temperature is in the range of from about 250° C. to about 350° C.

3. The process as in claim 1, wherein the liquid caustic solution is sodium hydroxide having a concentration in the range of from about 0.25 to about 7 moles/liters of solid base catalyst.

4. The process as in claim 1, wherein the liquid caustic solution is passed over the solid base catalyst composition at a liquid hourly space velocity in the range of from 0.1 h$^{-1}$ to 10 h$^{-1}$.

5. The process as in claim 1, wherein the liquid caustic solution is passed over the solid base catalyst composition at a liquid hourly space velocity in the range of from 0.5 h$^{-1}$ to 2 h$^{-1}$.

6. A solid base catalyst composition comprising a layered double hydroxide of the general formula (I)

$$ZnAl_2O_4 \cdot x(ZnO) \cdot y(Al_2O_3) \qquad (1)$$

wherein x and y are independently between 0 and 2, and wherein the total proportion of $ZnAl_2O_4$ in the formula (I) is at least 10 percent by weight;
wherein the layered double hydroxide has been alkaline treated by a liquid caustic solution.

\* \* \* \* \*